(12) United States Patent
O'Connor et al.

(10) Patent No.: US 10,546,586 B2
(45) Date of Patent: *Jan. 28, 2020

(54) CONVERSATION PATH REROUTING IN A DIALOG SYSTEM BASED ON USER SENTIMENT

(71) Applicant: International Business Machines Corporation, Armonk, NY (US)

(72) Inventors: Dan O'Connor, Milton, MA (US); William G. O'Keeffe, Tewksbury, MA (US); David D. Taieb, Charlestown, MA (US); Srikanth G. Tamilselvam, Ayapakkam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 573 days.

This patent is subject to a terminal disclaimer.

(21) Appl. No.: 15/258,086

(22) Filed: Sep. 7, 2016

(65) Prior Publication Data
US 2018/0068226 A1    Mar. 8, 2018

(51) Int. Cl.
| | |
|---|---|
| *G10L 15/25* | (2013.01) |
| *G10L 15/22* | (2006.01) |
| *G06N 3/00* | (2006.01) |
| *G10L 25/63* | (2013.01) |

(52) U.S. Cl.
CPC .............. *G10L 15/25* (2013.01); *G10L 15/22* (2013.01); *G06N 3/006* (2013.01); *G10L 25/63* (2013.01); *G10L 2015/223* (2013.01)

(58) Field of Classification Search
CPC ... G10L 15/25; G10L 15/22; G10L 2015/227; G06F 17/279; G06F 17/2785

USPC .................................................. 406/11–15
See application file for complete search history.

(56) References Cited

U.S. PATENT DOCUMENTS

| | | |
|---|---|---|
| 726,484 A | 4/1903 | Warren |
| 5,748,841 A | 5/1998 | Morin et al. |
| 6,731,307 B1 | 5/2004 | Strubbe et al. |
| 8,401,248 B1 | 3/2013 | Moon et al. |
| 9,013,591 B2 | 4/2015 | Jain et al. |
| 2001/0049688 A1 | 12/2001 | Fratkina et al. |
| 2004/0249638 A1 | 12/2004 | Wang |
| 2006/0206337 A1 | 9/2006 | Paek et al. |

(Continued)

FOREIGN PATENT DOCUMENTS

WO    2012054048    4/2012

OTHER PUBLICATIONS

Kaulard, et al., "The MPI Facial Expression Database—A Validated Database of Emotional and Conversational Facial Expressions," PloS one 7, vol. 7, No. 3, Mar. 2012, e32321, 18 pages.

(Continued)

*Primary Examiner* — Shahriar Behnamian
(74) *Attorney, Agent, or Firm* — Cantor Colburn LLP; Will Stock (57) ABSTRACT

Aspects include engaging a user in a chat flow by a dialog system. A user sentiment associated with a system response provided by the dialog system as part of the chat flow is determined based on observation of the user. A next system response is rerouted from a planned sequence of the chat flow to a sentiment-based repair sequence to alter content delivered to the user based on a detected aspect of the user sentiment.

10 Claims, 8 Drawing Sheets

(56) References Cited

U.S. PATENT DOCUMENTS

| | | | |
|---|---|---|---|
| 2008/0040199 A1 | 2/2008 | Pinhanez | |
| 2008/0059393 A1 | 3/2008 | Lee et al. | |
| 2009/0285456 A1 | 11/2009 | Moon et al. | |
| 2009/0306967 A1 | 12/2009 | Nicolov et al. | |
| 2012/0022857 A1 | 1/2012 | Baldwin et al. | |
| 2013/0005443 A1 | 1/2013 | Kosta et al. | |
| 2013/0268260 A1 | 10/2013 | Lundberg et al. | |
| 2013/0346886 A1* | 12/2013 | Cauchois | H04L 51/046 715/758 |
| 2014/0164530 A1* | 6/2014 | Stoertenbecker | H04L 51/32 709/206 |
| 2014/0237057 A1* | 8/2014 | Khodorenko | H04L 51/32 709/206 |
| 2014/0316765 A1 | 10/2014 | Fitterer et al. | |
| 2015/0032724 A1 | 1/2015 | Thirugnanasundaram et al. | |
| 2015/0256675 A1 | 9/2015 | Sri et al. | |
| 2016/0004299 A1 | 1/2016 | Meyer et al. | |
| 2016/0042281 A1 | 2/2016 | Cunico et al. | |
| 2016/0063993 A1 | 3/2016 | Dolan et al. | |
| 2016/0357253 A1 | 12/2016 | Abraham et al. | |
| 2017/0054848 A1 | 2/2017 | Meng et al. | |
| 2017/0118336 A1 | 4/2017 | Tapuhi et al. | |
| 2017/0163584 A1 | 6/2017 | Meng et al. | |
| 2017/0178005 A1 | 6/2017 | Kumar et al. | |
| 2017/0186419 A1* | 6/2017 | Erhart | G06Q 50/01 |
| 2017/0316777 A1 | 11/2017 | Perez et al. | |
| 2017/0324868 A1 | 11/2017 | Tamblyn et al. | |
| 2017/0373992 A1 | 12/2017 | Nair | |
| 2018/0032884 A1 | 2/2018 | Murugeshan et al. | |
| 2018/0052826 A1* | 2/2018 | Chowdhary | G06F 17/289 |
| 2018/0068012 A1* | 3/2018 | O'Connor | G06F 17/30976 |
| 2018/0331839 A1* | 11/2018 | Gao | H04L 12/1813 |

OTHER PUBLICATIONS

List of IBM Patents or Patent Applications Treated as Related, Oct. 11, 2016, 2 pages.

Scheirer, et al., "Expression Glasses: A Wearable Device for Facial Expression Recognition," ACM, May 15, 1999, 3 pages.

Tian, et al., "Recognizing and Regulating e-learners' Emotions Based on Interactive Chinese Texts in e-learning Systems," Knowledge-Based Systems 55, 2014, pp. 148-164.

U.S. Appl. No. 15/258,094, filed Sep. 7, 2016, Entitled: Chat Flow Tree Structure Adjustment Based on Sentiment and Flow History, First Named Inventor: Dan O'Connor.

* cited by examiner

CONVERSATION PATH REROUTING IN A DIALOG SYSTEM BASED ON USER SENTIMENT

BACKGROUND

This disclosure relates generally to dialog computer systems, and more specifically, to conversation path rerouting in a dialog system based on user sentiment.

A dialog system can provide a chat flow to a user to accomplish a task. A dialog system can often have hundreds of chat flows within it which range from welcoming the user, gathering basic user info, performing tasks for the user, and the like. These dialog systems are also being used in combination with natural language question answering systems, where a chat flow can provide a natural language response to a question asked within the chat flow.

Gathering user feedback within a dialog system is inherently difficult. Typical feedback mechanisms of a 5-star rating system or thumbs up/thumbs down feedback do not integrate well in a natural language conversation interface. Thus, it can be challenging for dialog system operators to know whether chat flows need modification and to accurately identify specific portions of the chat flows to improve.

SUMMARY

According to embodiments, a method, system, and computer program product are provided. A user is engaged in a chat flow by a dialog system. A user sentiment associated with a system response provided by the dialog system as part of the chat flow is determined based on observation of the user. A next system response is rerouted from a planned sequence of the chat flow to a sentiment-based repair sequence to alter content delivered to the user based on a detected aspect of the user sentiment.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments use facial expression tracking, voice characteristics, and/or interaction pattern observation to monitor real-time user sentiment toward responses returned by a dialog system. A path taken by the dialog system can then be altered to respond to emotional responses of a user without any direct input from the user to evaluate the system responses. Real-time user feedback as user sentiment can be used (e.g., by way of facial expression tracking, voice characteristics, and/or interaction patterns) to reroute a conversation to different conversation nodes within the dialog system. Complex dialog flows are inherently difficult to script. In embodiments, the dialog system can have an additional layer of feedback used to help calculate when the user has suddenly changed intent or when the system has responded in a way which surprised or frustrated the user. A planned sequence of the chat flow can be rerouted from a next system response to a sentiment-based repair sequence to alter content delivered to the user based on a detected aspect of the user sentiment. Embodiments can also track sentiment and flow history to identify and adjust system responses from a portion of a chat flow tree structure to reduce negative user sentiment.

Figure 1:
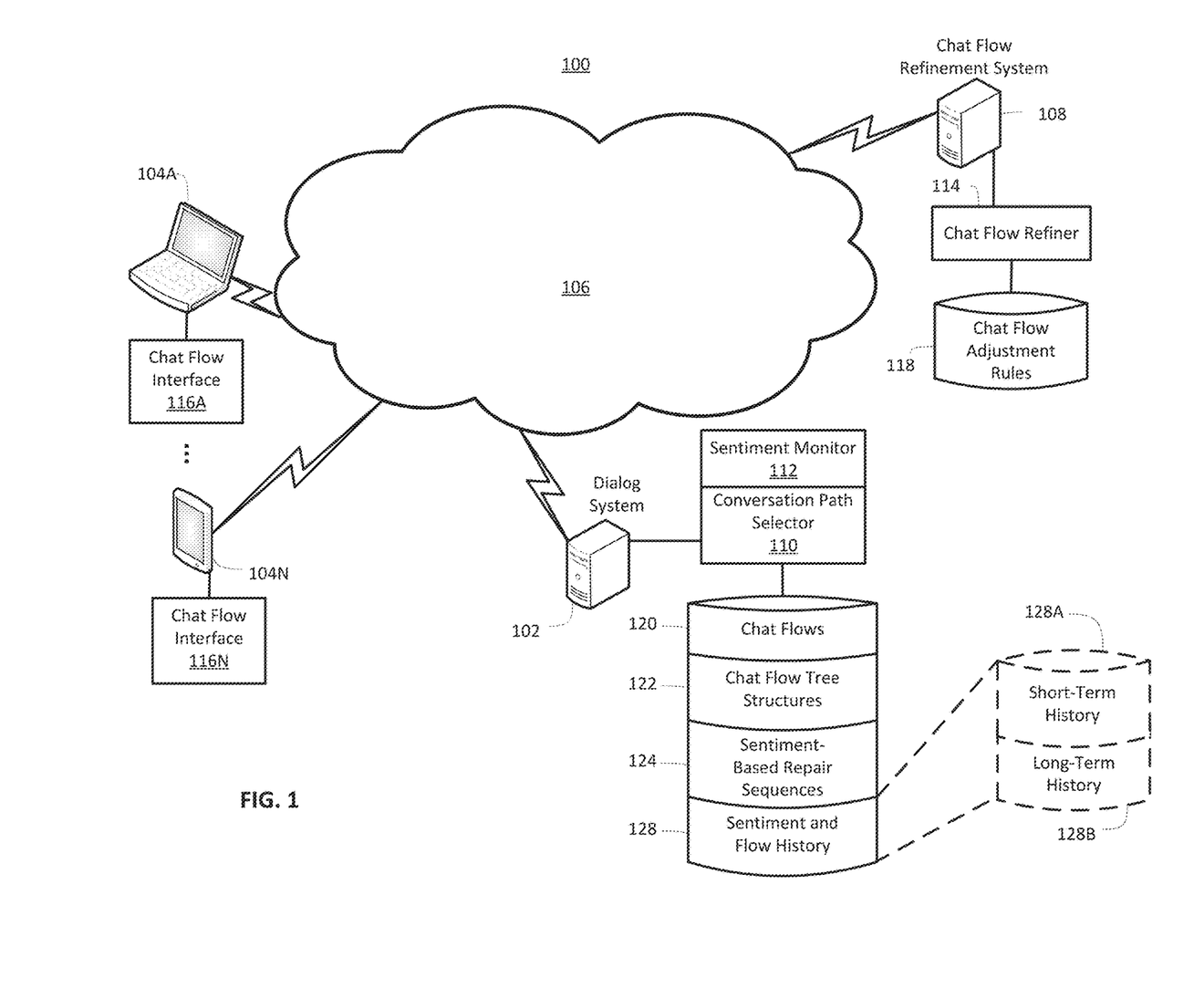
FIG. 1 depicts a system in accordance with an embodiment.

Turning now to FIG. 1, an example of a system 100 upon which conversation path rerouting and chat flow tree structure adjustment may be implemented will now be described in greater detail. The system 100 represents a networked environment, such as the Internet, where users can engage in statement/question-response interactions to retrieve answers/content and the like using an interactive dialog system.

In the example depicted in FIG. 1, the system 100 includes at least one dialog system 102 to interface with one or more user systems 104A-N over a network 106 to establish a real-time interactive conversation using one or more chat flows 120. A chat flow interface 116A-N of the user systems 104A-N can interface with the dialog system 102 to enable users of the chat flow interface 116A-N to make statements and receive system responses according to the chat flows 120 as part of an interactive automated human-machine conversation. Chat flows 120 can define paths through one or more chat flow tree structures 122 to select the most appropriate systems responses from one or more response sequences. A conversation path selector 110 of the dialog system 102 can select chat flows 120 and specific nodes of underlying chat flow tree structures 122 to follow as part of a conversation with a user through the chat flow interfaces 116A-N. A sentiment monitor 112 can also run on the dialog system 102 to track real-time user sentiment (e.g., based on user facial expression, voice characteristics, and/or interaction patterns) as emotional feedback to determine whether the conversation path selector 110 should deviate from a planned chat flow sequence to one or more sentiment-based repair sequences 124. The sentiment-based repair sequences 124 can include additional actions to alter content delivered to the user based on a detected aspect of the user sentiment. For instance, if the sentiment monitor 112 detects a surprise sentiment, an anger sentiment, or a disgust sentiment of the user based on a system response, the conversation path selector 110 can trigger the sentiment-based repair sequences 124 perform an action, such as augmenting the system response to return to a last point in the chat flows 120 where a positive sentiment was detected, prompting the user to accept further assistance associated with the system response, and/or searching the chat flows 120 to locate another potential match for a user statement that resulted in the system response. The sentiment monitor 112 can continue monitoring the user sentiment associated with the sentiment-based repair sequences 124 based on observation of the user. The conversation path selector 110 can progressively provide one or more alternate repair options in the sentiment-based repair sequences 124 based on determining that the user sentiment is a negative sentiment during the sentiment-based repair sequence. If a system response in the chat flows 120 is marked as expecting a negative sentiment, the conversation path selector 110 may block or filter a transition to the sentiment-based repair sequences 124 when the expected negative sentiment is detected by the sentiment monitor 112.

In embodiments, the sentiment monitor 112 executes on the dialog system 102 by receiving an image stream or video feed from the user systems 104A-N along with text and/or audio. In alternate embodiments, a portion or all of the sentiment monitor 112 runs on the user systems 104A-N, for instance, as a component of chat flow interfaces 116A-N, and the user sentiment is sent along with other user data (e.g., text/audio user statements, link selections, etc.) to the dialog system 102. In embodiments, a camera 275 (FIG. 2) of the user systems 104A-N captures facial expressions of the user to determine user sentiment using one or more known techniques and/or the process 700 of FIG. 7 as further described herein. Similarly, microphone 270 (FIG. 2) can be used separately or in combination with the camera 275 to determine user sentiment based on applying known voice characteristic analysis methods to map one or more of voice tone, changes in user voice volume, changes in user voice rate and the like to predetermined sentiment states and levels (e.g., happy, sad, surprised, angry, disgusted, fearful). Interaction patterns with the user can also be observed, such as changes in the rate of input, input force, delays in user responses, and the like.

As the sentiment monitor 112 determines user sentiment, a sentiment and flow history can be captured in sentiment and flow history 128, which may be further partitioned into a short-term history 128A and a long-term history 128B. The sentiment and flow history 128 can define an observed user sentiment captured for one or more system responses of response sequences in a chat flow tree structure 122 for a chat flow 120 of the dialog system 102. A chat flow refiner 114 can use chat flow adjustment rules 118 to analyze the sentiment and flow history 128 and flag each of the one or more system responses having a negative sentiment in the sentiment and flow history 128 and a sample size greater than a minimum adjustment threshold. The chat flow refiner 114 can adjust a portion of the chat flow tree structures 122 including at least one of the flagged system responses to reduce the negative sentiment according to process 800 of FIG. 8 as further described herein. In some embodiments, the chat flow refiner 114 executes on a chat flow refinement system 108 that may be separate from the dialog system 102. In other embodiments, the chat flow refiner 114 is part of the dialog system 102.

Although only one dialog system 102 is depicted in FIG. 1, it will be understood that there can be multiple dialog systems 102 which can interface with other networked components, such as user systems 104A-N and one or more chat flow refinement system 108 across the network 106 over a geographically wide area. The value of "N" refers to an arbitrary number and need not include the same number when referenced elsewhere throughout the application. Further, a portion or all of the dialog system 102 can be combined with one or more of the user systems 104A-N. The network 106 may be any type of communications network known in the art and can include a combination of wireless, wired, and/or fiber optic links.

In exemplary embodiments, the dialog system 102 and the chat flow refinement system 108 are each implemented on a high-speed processing device (e.g., a mainframe computer system, a cloud computing system, or the like) including at least one processing circuit (e.g., a computer processor/CPU) capable of reading and executing instructions, and handling interactions with various components of the system 100. Alternatively, the dialog system 102 and/or the chat flow refinement system 108 can be embodied entirely in hardware including circuits and memory to perform processes as described herein.

In exemplary embodiments, the user systems 104A-N can include a variety of computing devices with processing circuits and I/O interfaces, such as keys/buttons, a touchscreen, audio input, a display device and audio output. The user systems 104A-N may be embodied in any type of computing device known in the art, such as a laptop, tablet computer, mobile device, personal computer, workstation, server, and the like. Accordingly, the user systems 104A-N can include various computer/communication hardware and software technology known in the art, such as one or more processing units or circuits, volatile and non-volatile memory including removable media, power supplies, network interfaces, support circuitry, operating systems, and the like.

Figure 2:
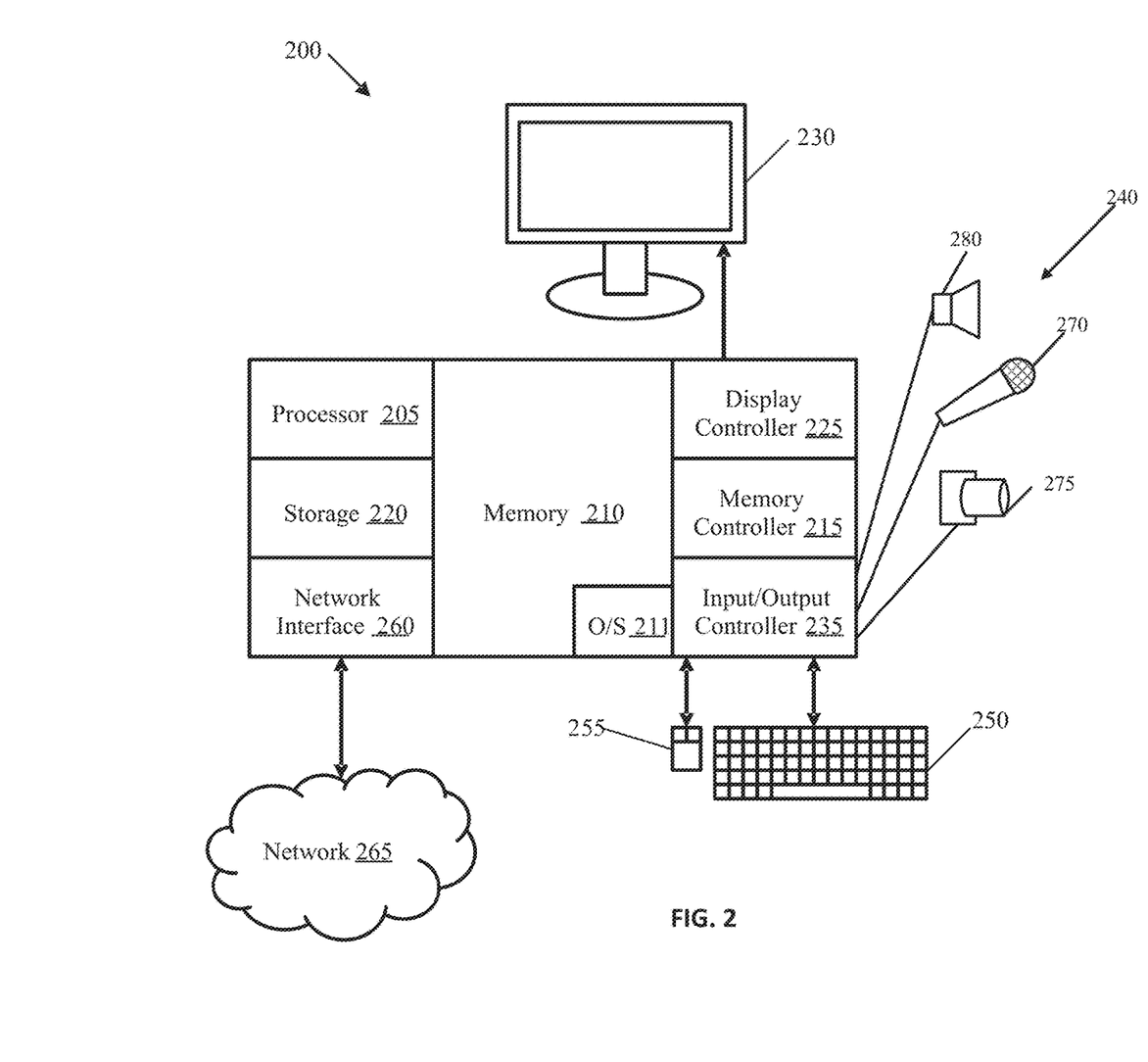
FIG. 2 depicts a block diagram of a computing device for implementing aspects of the system in accordance with an embodiment.

Turning now to FIG. 2, a block diagram of a computing device for implementing some or all aspects of the system 100 of FIG. 1 is generally shown in accordance with an embodiment. FIG. 2 illustrates a block diagram of a computing device 200 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 200, such as a cellular phone, a personal digital assistant (PDA), tablet computer, personal computer, workstation, minicomputer, or mainframe computer for example. For instance, embodiments of the computing device 200 can be used to implement one or more of the dialog system 102, user systems 104A-N, and/or chat flow refinement system 108 of FIG. 1.

In some embodiments, as shown in FIG. 2, the computing device 200 includes a processor 205, memory 210 coupled to a memory controller 215, and one or more I/O devices 240, which are communicatively coupled via a local I/O controller 235. These I/O devices 240 may include, for example, a microphone 270, a camera 275, one or more speaker 280, and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the computing device 200, a semiconductor based microprocessor (in the form of a microchip or chip set), a macroprocessor, or other device for executing instructions.

The memory 210 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services. The instructions in the memory 210 also include instructions for implementing embodiments of the conversation path selector 110, sentiment monitor 112, chat flow interfaces 116A-N, and/or chat flow refiner 114 of FIG. 1.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The computing device 200 may further include a display controller 225 coupled to a display 230. In some embodiments, the computing device 200 may further include a network interface 260 for coupling to a network 265, such as network 106 of FIG. 1. The network 265 may be an IP-based network for communication between the computing device 200 and an external server, client and the like via a broadband connection. The network 265 transmits and receives data between the computing device 200 and external systems. In some embodiments, the network 265 may be a managed IP network administered by a service provider. The network 265 may be implemented in a wireless fashion, e.g., using wireless protocols and technologies, such as WiFi, WiMax, etc. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 200, such as that illustrated in FIG. 2.

Figure 3:
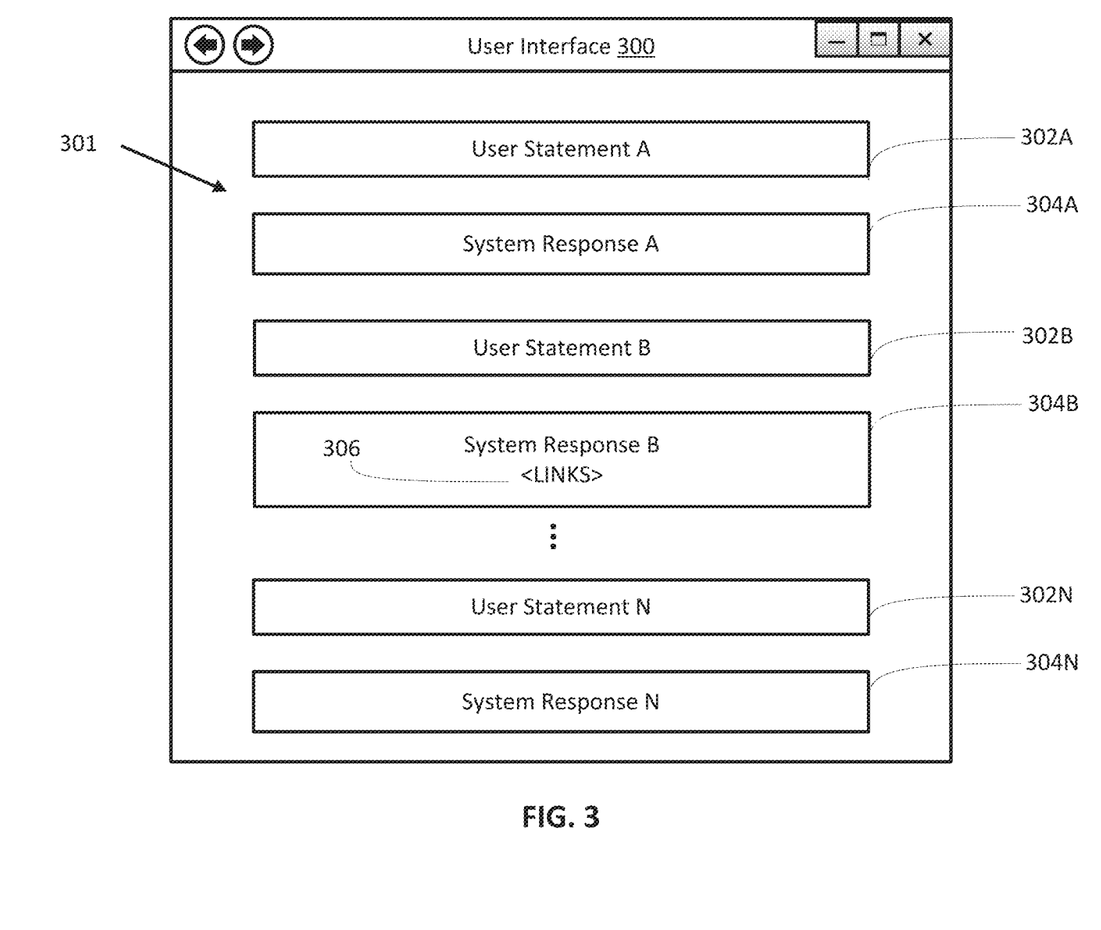
FIG. 3 depicts a user interface for a chat flow of a dialog system in accordance with an embodiment.

FIG. 3 depicts a user interface 300 with a plurality of user statements 302 and system responses 304 as part of an interactive conversation 301 in accordance with an embodiment. The user interface 300 may be presented on one of the chat flow interfaces 116A-N at user systems 104A-N of FIG. 1. Upon receiving a user statement 302A in a natural language format, the user statement 302A is sent to the dialog system 102 of FIG. 1 for the conversation path selector 110 to determine and retrieve system response 304A based on one of the chat flows 120 of FIG. 1. The system response 304A can include multiple response terms, such as instructions, information, and/or links 306. As the system response 304A is provided to the user via one of the chat flow interfaces 116A-N at user systems 104A-N of FIG. 1, user facial expressions and/or voice characteristics can be tracked using the camera 275 and/or microphone 270 of FIG. 2 to determine a user sentiment associated with system response 304A by the sentiment monitor 112 of FIG. 1. Similarly, tracking of user interaction patterns with keyboard 250, mouse 255, and/or a touch-based interface, can be used to determine user sentiment according to known techniques. The interactive conversation 301 continues alternating between user statements 302B-302N and system responses 304B-304N.

When a user is traversing a branch of a chat flow tree structure 122 in the dialog system 102 of FIG. 1, it is often difficult for the user to exit the branch and traverse a different path. An example of engaging in a series of statements/questions and responses/answers with the dialog system 102 to update a user's address to try to switch to getting a car insurance quote is provided as follows.

User>I need to change my address.
System>No problem I can help you with that. Do you still live in the United States?
User>Yes
System>Which state do you live in?
User>MA
System>Great. Which city in MA do you live in?
User>Will my car insurance premium change now that I've moved?
System>I'm sorry, I don't recognize that city, what is the zip code?

In this case, the user is resisting the track (path/branch) proposed by the dialog system 102. The dialog system 102 is trained/programmed to try to obtain all of the address information from the user before moving to the next chat sequence (e.g., obtain a quote). This can present a difficult situation for a typical dialog system to handle. Further, going back a single step in chat flow can present difficulties. For example, if the user asks what her insurance deductible was, the dialog system 102 may respond by asking if the user meant home insurance or car insurance. Accidentally clicking on the wrong link in a response can get the user stuck in a chat flow for the wrong insurance type, as illustrated in the following example.

User>How much is the premium for my insurance policy?
System>Please select a policy:
   Home Insurance policy HOxxxxxx
   Auto Insurance policy Axxxxxx←user clicks auto link by mistake
System>Thank you, your auto policy has varying deductibles. Please specify which deductible you would like to know more about:

Glass Coverage
Liability
Collision
Comprehensive
Uninsured Motorist
User>I meant Home Insurance.
System>Your collision deductible is $500. Every year hundreds of motorists have accidents right in their own driveways. If this happens to you, don't worry, we have you covered!

The user in this example had no easy way to get back to select Home Insurance instead of Auto Insurance, and the dialog system 102 may have no way for the user to directly indicate that the user was unhappy with auto deductible options. Embodiments observe user sentiment based on facial expressions, voice characteristics, and/or interaction patterns to reroute a next system response from a planned sequence of the chat flow to a sentiment-based repair sequence to alter content delivered to the user based on a detected aspect of the user sentiment. Through the use of the sentiment monitor 112 of FIG. 1, the system response sequence of the previous example can be modified as follows.

User>How much is the premium for my insurance policy?
System>Please select a policy:
   Home Insurance policy HOxxxxxx
   Auto Insurance policy Axxxxxx←user clicks auto link by mistake
(The monitored user reaction is positive, and the dialog system 102 is likely performing well up to this point.)
System>Thank you, your auto policy has varying deductibles. Please specify which deductible you would like to know more about:
   Glass Coverage
   Liability
   Collision
   Comprehensive
   Uninsured Motorist The user is unhappy with this response as detected by the sentiment monitor 112. The conversation path selector 110 can use the user sentiment to perform one or more of the sentiment-based repair sequences 124 of FIG. 1.

As one example, the sentiment-based repair sequences 124 include augmenting an existing system response with an option to return to the last point in the chat flow with a positive reaction. This option is illustrated in the following sequence.

User>How much is the premium for my insurance policy?
System>Please select a policy:
   Home Insurance policy HOxxxxxx
   Auto Insurance policy Axxxxxx←user clicks auto link by mistake
System>Thank you, your auto policy has varying deductibles. Please specify which deductible you would like to know more about:
   Glass Coverage
   Liability
   Collision
   Comprehensive
   Uninsured Motorist
Return to policy selection (augmentation added to system response as another link)

A further option for the sentiment-based repair sequences 124 includes prompting the user to accept further assistance associated with the system response as illustrated in the following example sequence.

User>How much is the premium for my insurance policy?
System>Please select a policy:
   Home Insurance policy HOxxxxxx
   Auto Insurance policy Axxxxxx←user clicks auto link by mistake
System>Thank you, your auto policy has varying deductibles. Please specify which deductible you would like to know more about:
   Glass Coverage
   Liability
   Collision
   Comprehensive
   Uninsured Motorist
System>Do you need assistance?
   Help me choose the correct coverage option←this can be a child chat flow that only becomes enabled for negative sentiment responses
   Return to policy selection←return to last known good point in the chat flow
   Ask a new question←give the user an option to abandon this chat flow completely and start over In this example, the dialog system 102 does not wait for the user to explicitly state why she was unhappy; rather, the dialog system 102 preempts the user by applying the sentiment-based repair sequences 124 to provide an improved user experience.

As another example, the sentiment-based repair sequences 124 include waiting for user input as illustrated in the following example sequence.

User>How much is the premium for my insurance policy?
System>Please select a policy.
   Home Insurance policy HOxxxxxx
   Auto Insurance policy Axxxxxx←user clicks auto link by mistake
System>Thank you, your auto policy has varying deductibles. Please specify which deductible you would like to know more about:
   Glass Coverage
   Liability
   Collision
   Comprehensive
   Uninsured Motorist
User>I meant Home Insurance.
System>Your Home Insurance policy has varying deductibles. Please specify which deductible you would like to know more about:
   Accidental Damage
   Flood
   . . . .

In this scenario, when the user indicates a negative sentiment and provides a new user statement, a different matching algorithm is used to redirect the sequence within the chat flow. Instead of assuming that the input is related to the current subtree (auto insurance), the dialog system 102 can search the parent tree and sibling subtrees. In this case, a match of "Home Insurance" can be identified from the user statement to shift the chat flow to a "Home Insurance" flow for deductibles and redirects the user to that chat flow instead.

In some instances, users may ask questions that the dialog system 102 does not understand, and this can be frustrating to the user. In this situation, the dialog system 102 can monitor the number of negative reactions by the user as an indication of when to intervene (e.g., a change in a sentiment trajectory beyond a minimum repair threshold). For example, the user may be asking a question about umbrella policies to a system that only knows about home and auto insurance as illustrated in the following sequence.

User>Should I have an umbrella policy as well as my home insurance?
System>I can help with your home insurance. Would you like to:
  Get a home insurance quote
  Make changes to an existing home insurance policy
The dialog system 102 was able to match home insurance with the general "Home Insurance" chat flow in this example. So this appears to be a reasonable response for the dialog system 102. However, the user reaction is negative since she was asking about something completely different.
User>How much liability coverage can I get with an umbrella policy?
System>I can help you choose how much liability coverage you need for your Auto policy . . . .

Again liability coverage would match an Auto Liability chat flow to help a user choose how much liability coverage she would need. In this case, again, the user reaction would be negative.

Having received two negative responses, this could mean different things at different locations within the chat flow, but regardless, the overall negative impression of the dialog system 102 can trigger an action as illustrated in the following sequence.
User>Should I have an umbrella policy as well as my home insurance?
System>I can help with your home insurance. Would you like to:
  Get a home insurance quote
  Make changes to an existing home insurance policy
User>How much liability coverage can I get with an umbrella policy? (negative sentiment detected)
System>I can help you choose how much liability coverage you need for your Auto policy . . . (negative sentiment detected)
System>I'm sorry if I'm not being helpful, I'm still learning. Would you like to:
  Learn more about what this system is capable of
  Ask questions about Home Insurance
  Ask questions about Auto Insurance
  Speak directly to an agent
Here, the user has been redirected to a "negative sentiment" chat flow of the sentiment-based repair sequences 124, which tries to show the user how to use the dialog system 102. A negative sentiment chat flow can give the user information about how the dialog system 102 works, what categories of questions can be asked, or ultimately give the user an option to speak to an agent as the dialog system 102 may not be trained to deal with the question/request. Selectively providing the user with various repair options can help users have a better experience with the dialog system 102.

Over time an overall sentiment per chat flow/sub-flow can be built up in the sentiment and flow history 128. As the complexity and size of the chat flow tree structures 122 grow, it can become difficult to maintain. Questions, responses, and flows can become obsolete. Given difficulties with classic feedback mechanisms, the user sentiment captured in the sentiment and flow history 128 can be examined to determine which parts of the chat flow tree structures 122 are not being well received by users. Chat flows 120, where users generally give up and are unhappy, can be pruned or refactored. By tracking sentiment for every system response, a very fine grained analysis can be performed on the chat flows 120 to identify problem areas.

In another example, some chat flows 120 expect negative responses as illustrated in the following example.
User>I was in an accident, do I have to pay a deductible?
System>Yes, you will have to pay your deductible. However, if you are found not to be at fault, it will be refunded to you.

In this case, the answer is correct, but it is likely that the user will not be happy about it. A given flow can be denoted to expect negative responses or surprised responses without triggering redirects. The dialog system 102 can still prompt the user to be sure the answer is correct as illustrated in the following example.
User>I was in an accident, do I have to pay a deductible?
System>Yes, you will have to pay your deductible. However, if you are found not to be at fault, it will be refunded to you. (negative sentiment detected)
System>Did my response answer your question?

In some embodiments, sentiment data, such as negative sentiment, is tracked with respect to content. Sentiment associations to content can allow content owners to better understand what aspects users consistently show a positive or negative sentiment towards. Such sentiment to content feedback can support product improvement. For instance, consider the following example chat flow with dialog system 102.
User>How do I add emojis to an email?
System>Currently, this application does not provide an emoticons palette. You can import an image into an email by . . . (negative sentiment detected)
Chat flows such as this example can be tagged as a product enhancement request. The level of negativity as well as the number of negative responses may provide a priority to such product enhancement requests.

Figure 4:
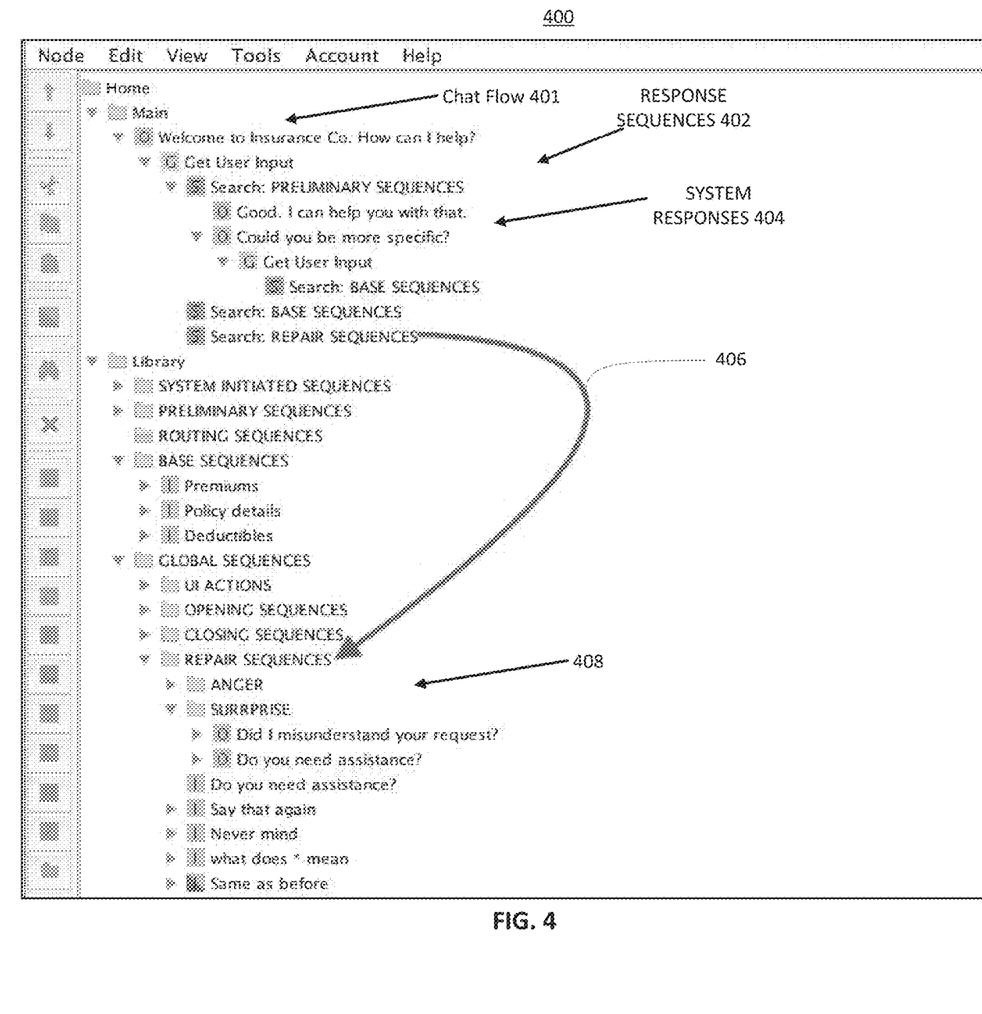
FIG. 4 depicts a chat flow refiner interface in accordance with an embodiment.

FIG. 4 depicts a chat flow refiner interface 400 of the chat flow refiner 114 of FIG. 1 in accordance with an embodiment. The chat flow refiner interface 400 can enable a developer to establish response sequences 402 with system responses 404 in one or more chat flows 401. Different trigger paths 406 to sentiment-based repair sequences 408 can be defined on a response sequence 402 basis or be defined for particular system responses 404. Updates to the response sequences 402 can be manually made and/or automatically adjusted based on chat flow refiner 114 analysis of the sentiment and flow history 128 of FIG. 1.

Figure 5:
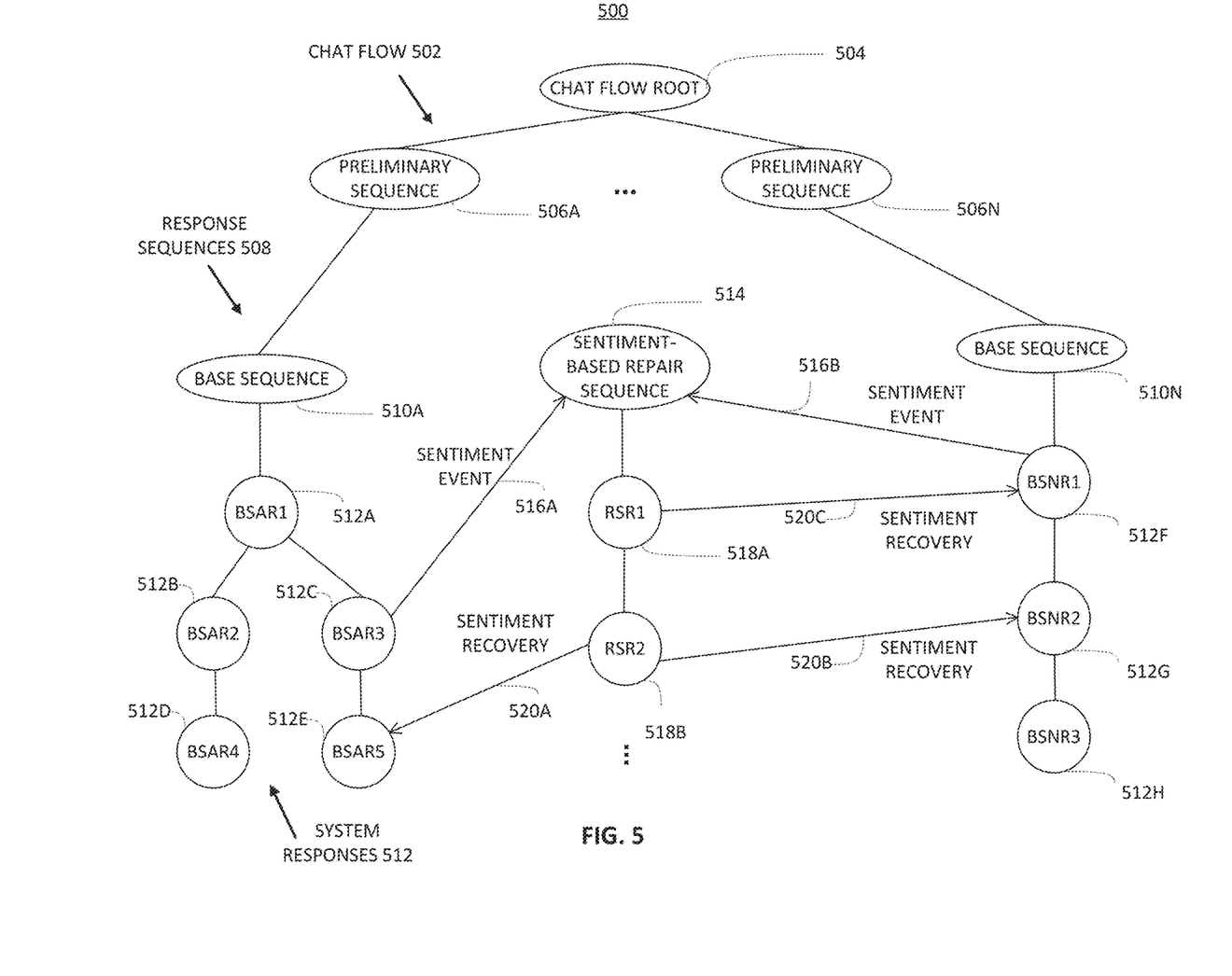
FIG. 5 depicts a chat flow tree structure in accordance with an embodiment.

FIG. 5 depicts a chat flow tree structure 500 for a chat flow 502 in accordance with an embodiment as a simplified example of one of the chat flows 120 and chat flow tree structures 122 of FIG. 1. A chat flow root 504 of the chat flow tree structure 500 can lead to one or more preliminary sequences 506A-N, for instance, including introduction information depending upon an initial user selection. Response sequences 508 can include a base sequence 510A reachable from preliminary sequence 506A and additional sequences, such as base sequence 510N reachable from preliminary sequence 506N. The response sequences 508 can include a number of system responses 512 sequenced in an order intending to guide a user in a logical order. For instance, base sequence 510A can include system response 512A that is expected to lead to system response 512B or 512C. System response 512B is expected to lead to system response 512D, and system response 512C is expected to lead to system response 512E in this example. Further in the example of FIG. 5, base sequence 510N includes system response 512F that is expected to lead to system response 512G followed by system response 512H.

As the chat flow 502 traverses through the chat flow tree structure 500 based on interactions with a user of one of the chat flow interfaces 116A-N of FIG. 1, the sentiment monitor 112 of FIG. 1 may detect a negative sentiment, resulting the conversation path selector 110 of FIG. 1 transitioning to sentiment-based repair sequence 514 as an example of one of the sentiment-based repair sequences 124 of FIG. 1. For instance, if a sentiment event 516A is detected at system response 512C, then prior to advancing directly to system response 512E, the sentiment based repair sequence 514 may traverse through repair responses 518A and/or 518B for sentiment recovery 520A, e.g., prompting the user to accept further assistance. Similarly, if a sentiment event 516B is detected at system response 512F, then prior to advancing directly to system response 512G, the sentiment based repair sequence 514 may traverse through repair responses 518A and/or 518B for sentiment recovery 520B. Where the sentiment event 516A is a change of intent, the repair response 518A may perform searching of the chat flow 502 to locate another potential match for a user statement that resulted in the system response 512C, which may lead to sentiment recovery 520C as a switch from base sequence 510A to system response 512F of base sequence 510N. As another example, the sentiment event 516B from system response 512F can lead to the repair response 518A and sentiment recovery 520C augmenting the system response 512F to return to a last point in the chat flow 502 where a positive sentiment was detected, for instance, by adding a link to a higher node in the chat flow tree structure 500.

Figure 6:
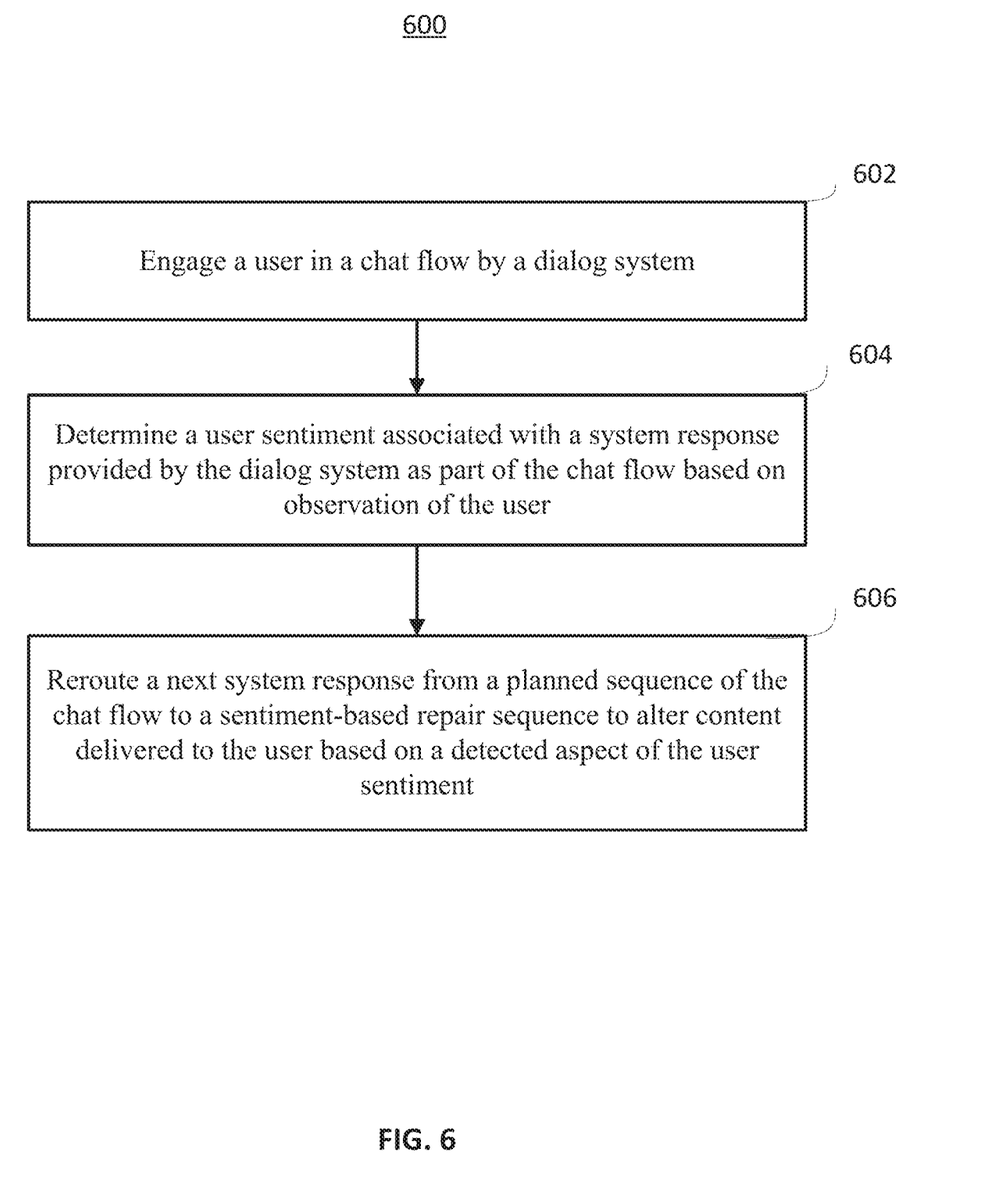
FIG. 6 depicts a flow diagram for chat flow rerouting based on user sentiment in accordance with an embodiment.

Turning now to FIG. 6, a flow diagram of a process 600 for chat flow rerouting based on user sentiment is generally shown in accordance with an embodiment. The process 600 is described with reference to FIGS. 1-5 and may include additional steps beyond those depicted in FIG. 6. The process 600 is described with respect to conversation path selector 110 and sentiment monitor 112 but may be performed separately by or in combination with one or more other applications. At block 602, dialog system 102 engages a user in a chat flow 502, such as one of the chat flows 120 as part of an interactive conversation 301, via one of the chat flow interfaces 116A-N.

At block 604, the sentiment monitor 112 determines a user sentiment associated with a system response provided by the dialog system 102 as part of the chat flow 502 based on observation of the user. For instance, a facial expression, voice characteristics, and/or interaction patterns of the user can be tracked in real-time as the user interacts with the dialog system 102. A camera 275 of the user systems 104A-N can capture the facial expressions as a stream of images or video, and/or microphone 270 of the user systems 104A-N can capture audio data to determine user sentiment from voice characteristics. As one example, the sentiment monitor 112 can apply the process 700 of FIG. 7 or another process known in the art to determine user sentiment from facial expressions. Facial expressions, voice characteristics, and/or interaction patterns of the user can be tracked during and between interactions with the dialog system 102. For instance, a user may say things to themselves such as "well that's a stupid answer", etc. Keyboard 250 and mouse 255 (or touch interface) activity observations may indicate sentiment through observed interaction patterns. As an example, a user may type in "poor effort" or a similar remark before deleting it and asking a real question. If force sensors are incorporated in the user interface, changes in applied force can be detected as part of an interaction pattern. Further, the microphone 270 may listen for sounds indicating changes in how hard keys are being pressed as part of an interaction pattern.

At block 606, the conversation path selector 110 can reroute a next system response from a planned sequence of the chat flow 502 to a sentiment-based repair sequence 514 to alter content delivered to the user based on a detected aspect of the user sentiment. The aspect of the user sentiment can include one or more of a surprise sentiment, an anger sentiment, and/or a disgust sentiment. Alternatively, the aspect of the user sentiment can include a change in a sentiment trajectory beyond a minimum repair threshold. For example, if a sentiment trajectory is considered negative and persists for multiple system responses and/or gets progressively more negative over multiple responses, rerouting may be performed where the minimum repair threshold can be defined in terms of a simple count of negative events or an increasingly negative trend of user sentiment over a period of time. The sentiment-based repair sequence 514 can include one or more of augmenting the system response to return to a last point in the chat flow 502 where a positive sentiment was detected, prompting the user to accept further assistance associated with the system response, and/or searching the chat flow 502 to locate another potential match for a user statement that resulted in the system response.

In embodiments, the sentiment monitor 112 can continue monitoring the user sentiment associated with the sentiment-based repair sequence 514 based on the facial expression, voice characteristics, and/or interaction patterns of the user and progressively provide one or more alternate repair options in the sentiment-based repair sequence 514 based on determining that the user sentiment is a negative sentiment during the sentiment-based repair sequence 514. Further, the conversation path selector 110 can determine whether the system response is marked as expecting a negative sentiment and block the sentiment-based repair sequence 514 based on determining that the system response is marked as expecting the negative sentiment.

Figure 7:
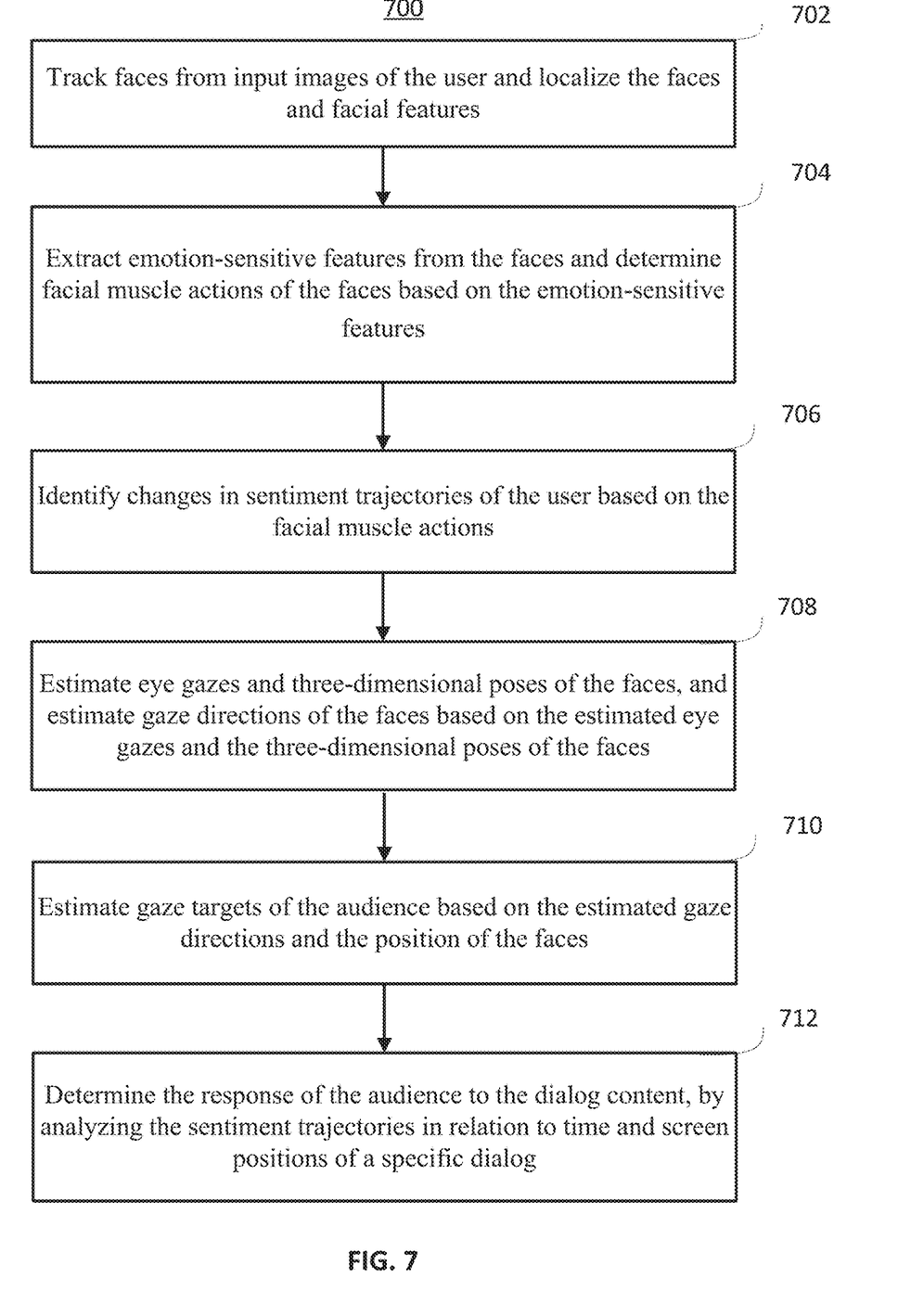
FIG. 7 depicts a flow diagram for determining user sentiment in accordance with an embodiment.

Turning now to FIG. 7, a flow diagram of a process 700 for determining user sentiment is generally shown in accordance with an embodiment. The process 700 is described with reference to FIGS. 1-6 and may include additional steps beyond those depicted in FIG. 7. The process 700 is described with respect to the sentiment monitor 112 but may be performed separately by or in combination with one or more other applications. At block 702, the sentiment monitor 112 can track faces from input images of the user captured by camera 275 and localize the faces and facial features. For instance, there may be multiple face images captured by the camera 275 over a sampling time period. At block 704, emotion-sensitive features are extracted from the faces and facial muscle actions of the faces are determined based on the emotion-sensitive features.

At block 706, changes in affective states, called sentiment trajectories, of the user are identified based on the facial muscle actions. For instance, facial expressions can be translated into six basic emotions: Happiness, Sadness, Surprise, Anger, Disgust, and Fear. At block 708, eye gazes and three-dimensional poses of the faces are estimated, and gaze directions of the faces are estimated based on the estimated eye gazes and the three-dimensional poses of the faces. At block 710, gaze targets of the audience (e.g., one or more users) are estimated based on the estimated gaze directions and the position of the faces. At block 712, the response of the audience to the dialog content is determined, by analyzing the sentiment trajectories in relation to time and screen positions of a specific dialog.

Figure 8:
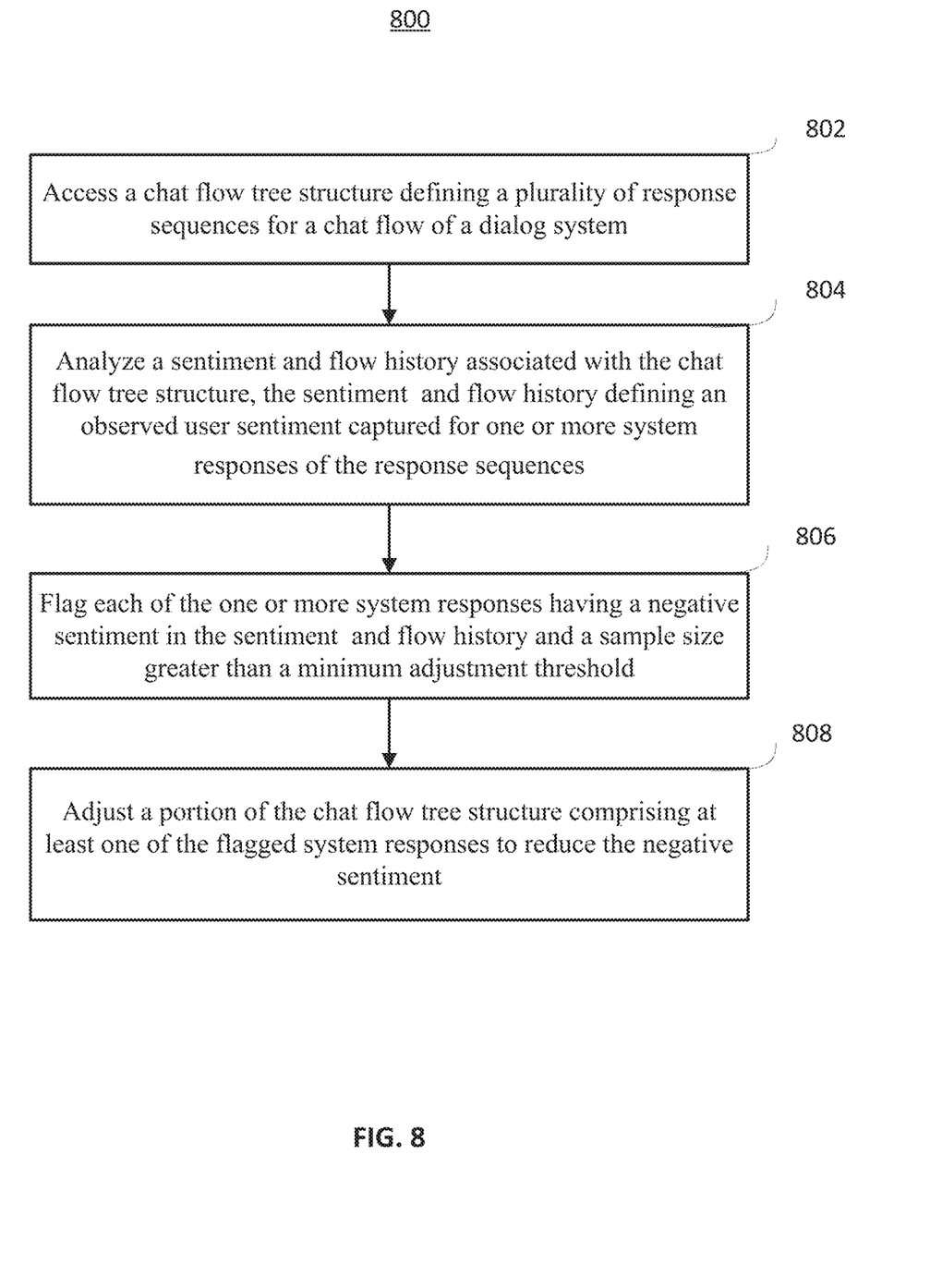
FIG. 8 depicts a flow diagram for chat flow tree structure adjustment based on sentiment and flow history in accordance with an embodiment.

Turning now to FIG. 8, a flow diagram of a process 800 for chat flow tree structure adjustment is generally shown in accordance with an embodiment. The process 800 is described with reference to FIGS. 1-7 and may include additional steps beyond those depicted in FIG. 8. The process 800 is described with respect to the chat flow refiner 114 but may be performed separately by or in combination with one or more other applications.

At block 802, a chat flow tree structure 500 is accessed defining a plurality of response sequences 508 for a chat flow 502 of a dialog system 102.

At block 804, a sentiment and flow history 128 associated with the chat flow tree structure 500 is analyzed, where the sentiment and flow history 128 defines an observed user sentiment captured for one or more system responses 512 of the response sequences 508. At block 806, each of the one or more system responses 512 is flagged having a negative sentiment in the sentiment and flow history 128 and a sample size greater than a minimum adjustment threshold. The minimum adjustment threshold can be used to ensure that adjustments to the chart flow tree structure 500 are not automatically performed in response to a single user experiencing a single problem. The negative sentiment can be one or more of a surprise sentiment, an anger sentiment, and/or a disgust sentiment. Analysis of the sentiment and flow history 128 can include searching for a history of rerouting a next system response from a planned sequence of the chat flow 502 to a sentiment-based repair sequence 514 to alter content delivered to the user based on a detected aspect of the user sentiment. Analysis of the sentiment and flow history 128 can also include searching for the negative sentiment in combination with a premature termination of the chat flow 502, e.g., where a user quits in frustration.

At block 808, a portion of the chat flow tree structure 500 including at least one of the flagged system responses is adjusted to reduce the negative sentiment. Adjusting the portion of the chat flow tree structure 500 can include inserting one or more prompts for the user to accept further assistance prior to one or more of the flagged system responses. Adjusting the portion of the chat flow tree structure 500 can include removing one or more of the flagged system responses from the chat flow tree structure 500.

In some embodiments, the sentiment and flow history 128 includes a short-term history 128A and a long-term history 128B that stores data collected over a longer period of time than the short-term history 128A. The chat flow refiner 114 can compare the user sentiment in the short-term history 128A with the user sentiment in the long-term history 128B after adjusting the portion of the chat flow tree structure 500 to determine whether the adjustment was effective in reducing the negative sentiment. If the adjustment is deemed ineffective, the chat flow refiner 114 may perform another or alternative adjustment (e.g., performing an additional adjustment, or undo the adjustment and try a different adjustment). A product enhancement request can be identified by the chat flow refiner 114 or other analysis tool based on a level of negativity and a number of negative responses associated with content provided to one or more users.

Technical effects and benefits include conversation path rerouting and chat flow tree structure adjustment based on observed user sentiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method, comprising:
    engaging a user in a chat flow by a dialog system comprising a computer system;
    tracking, by a sentiment monitor executing on the computer system, a plurality of facial images of the user as captured by a camera coupled to the computer system;
    determining, by the sentiment monitor, a plurality of facial muscle actions of the user based on the facial images;
    identifying, by the sentiment monitor, a facial expression of the user based on the facial muscle actions;
    estimating, by the sentiment monitor, an eye gaze direction and a facial position of the user based on the facial images;
    determining, by the sentiment monitor, a user sentiment associated with a system response in dialog content on a display provided by the dialog system as part of the chat flow based on the facial expression, the eye gaze direction, and a facial position of the user in relation to time and a screen position of the dialog content;
    determining whether the system response is marked as expecting a negative sentiment;
    traversing through a planned sequence of the chat flow to a next system response based on detecting a positive sentiment;
    traversing through the planned sequence of the chat flow to the next system response based on detecting the negative sentiment and determining that the system response is marked as expecting the negative sentiment;
    rerouting the next system response from the planned sequence of the chat flow to a sentiment-based repair sequence to alter content delivered to the user based on a detected aspect of the user sentiment and determining that the system response is not marked as expecting the negative sentiment; and
    progressively providing two or more alternate repair options in the sentiment-based repair sequence based on determining that the user sentiment is the negative sentiment during the sentiment-based repair sequence, wherein the two or more alternate repair options in the sentiment-based repair sequence comprise two or more of prompting the user to accept further assistance associated with the system response, searching the chat flow to locate another potential match for a user statement that resulted in the system response, and augmenting the system response to return to a last point in the chat flow where the positive sentiment was detected.

2. The method of claim 1, wherein the aspect of the user sentiment comprises one or more of a surprise sentiment, an anger sentiment, and a disgust sentiment.

3. The method of claim 1, wherein the aspect of the user sentiment comprises a change in a sentiment trajectory beyond a minimum repair threshold.

4. The method of claim 1, further comprising:
    monitoring the user sentiment associated with the sentiment-based repair sequence based on one or more of the facial expression, a voice characteristic, and an interaction pattern of the user.

5. A system, comprising:
    a display;
    a camera;
    a memory having computer readable instructions; and
    a processor for executing the computer readable instructions, the computer readable instructions including:
    engaging a user in a chat flow by a dialog system;
    tracking a plurality of facial images of a user as captured by the camera;
    determining a plurality of facial muscle actions of the user based on the facial images;
    identifying a facial expression of the user based on the facial muscle actions;

estimating an eye gaze direction and a facial position of the user based on the facial images;

determining a sentiment of the user associated with dialog content on the display based on the facial expression, the eye gaze direction, and a facial position of the user in relation to time and a screen position of the dialog content;

determining whether the system response is marked as expecting a negative sentiment;

traversing through a planned sequence of the chat flow to a next system response based on detecting a positive sentiment;

traversing through the planned sequence of the chat flow to the next system response based on detecting the negative sentiment and determining that the system response is marked as expecting the negative sentiment;

rerouting the next system response from the planned sequence of the chat flow to a sentiment-based repair sequence to alter content delivered to the user based on a detected aspect of the user sentiment and determining that the system response is not marked as expecting the negative sentiment; and progressively providing two or more alternate repair options in the sentiment-based repair sequence based on determining that the user sentiment is the negative sentiment during the sentiment-based repair sequence, wherein the two or more alternate repair options in the sentiment-based repair sequence comprise two or more of prompting the user to accept further assistance associated with the system response, searching the chat flow to locate another potential match for a user statement that resulted in the system response, and augmenting the system response to return to a last point in the chat flow where the positive sentiment was detected.

6. The system of claim 5, wherein the aspect of the user sentiment comprises one or more of a surprise sentiment, an anger sentiment, and a disgust sentiment.

7. The system of claim 5, wherein the aspect of the user sentiment comprises a change in a sentiment trajectory beyond a minimum repair threshold.

8. The system of claim 5, wherein the computer readable instructions further comprise:

monitoring the user sentiment associated with the sentiment-based repair sequence based on one or more of the facial expression, a voice characteristic, and an interaction pattern of the user.

9. A computer program product comprising a non-transitory computer readable storage medium having program instructions embodied therewith, the program instructions executable by a processor to cause the computer processor to perform:

engaging a user in a chat flow by a dialog system;

tracking a plurality of facial images of a user as captured by the camera;

determining a plurality of facial muscle actions of the user based on the facial images;

identifying a facial expression of the user based on the facial muscle actions;

estimating an eye gaze direction and a facial position of the user based on the facial images;

determining a sentiment of the user associated with dialog content on the display based on the facial expression, the eye gaze direction, and a facial position of the user in relation to time and a screen position of the dialog content;

determining whether the system response is marked as expecting a negative sentiment;

traversing through a planned sequence of the chat flow to a next system response based on detecting a positive sentiment;

traversing through the planned sequence of the chat flow to the next system response based on detecting the negative sentiment and determining that the system response is marked as expecting the negative sentiment;

rerouting the next system response from the planned sequence of the chat flow to a sentiment-based repair sequence to alter content delivered to the user based on a detected aspect of the user sentiment and determining that the system response is not marked as expecting the negative sentiment; and progressively providing two or more alternate repair options in the sentiment-based repair sequence based on determining that the user sentiment is the negative sentiment during the sentiment-based repair sequence, wherein the two or more alternate repair options in the sentiment-based repair sequence comprise two or more of prompting the user to accept further assistance associated with the system response, searching the chat flow to locate another potential match for a user statement that resulted in the system response, and augmenting the system response to return to a last point in the chat flow where the positive sentiment was detected.

10. The computer program product of claim 9, further comprising:

monitoring the user sentiment associated with the sentiment-based repair sequence based on one or more of the facial expression, a voice characteristic, and an interaction pattern of the user.

* * * * *